W. E. WATTS.
BEARING FOR ROOF HOOKS.
APPLICATION FILED JULY 22, 1913.

1,132,411.

Patented Mar. 16, 1915.

Witnesses
Hugh H. Ott
E. Edmondson Jr.

Inventor
William E. Watts
By Victor J. Evans
Attorney

UNITED STATES PATENT OFFICE.

WILLIAM E. WATTS, OF LOS ANGELES, CALIFORNIA, ASSIGNOR OF ONE-THIRD TO FLORENCE W. MERRILL, OF LONG BEACH, CALIFORNIA, AND ONE-THIRD TO IRVING FOULKS, OF LOS ANGELES, CALIFORNIA.

BEARING FOR ROOF-HOOKS.

1,132,411.  Specification of Letters Patent.  Patented Mar. 16, 1915.

Application filed July 22, 1913. Serial No. 780,497.

*To all whom it may concern:*

Be it known that I, WILLIAM E. WATTS, a citizen of the United States, residing at Los Angeles, in the county of Los Angeles and State of California, have invented new and useful Improvements in Bearings for Roof-Hooks, of which the following is a specification.

This invention relates to painters' staging hooks and more particularly to safety devices to be used in connection therewith.

One of the principal objects of the invention is to provide a simple and efficient device which may be lashed or otherwise attached to the building and which is adapted to engage the end of the hook and hold the same against displacement, at the same time permitting a rotary movement of the hook when necessary.

Further objects of the invention will appear as the following description is read in connection with the accompanying drawing, which forms a part of this application, and in which:—

Figure 1:
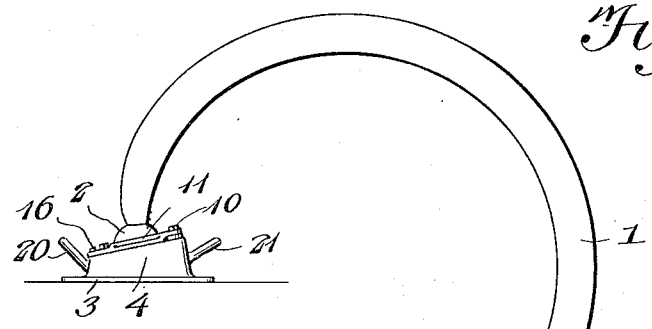
Figure 3:
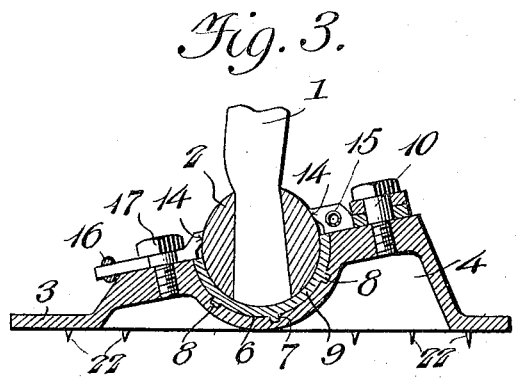
Figure 2:
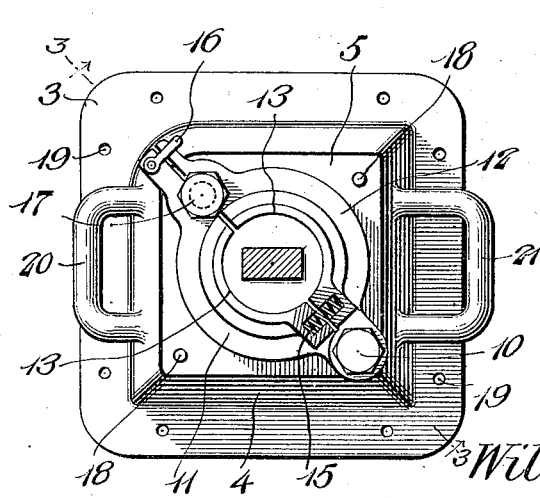

Figure 1 is a side elevation showing a portion of an ordinary painter's hook mounted in the device. Fig. 2 is a top plan view thereof with the hook in section. Fig. 3 is a sectional view taken on the line 3—3 of Fig. 2.

In the specific embodiment of the invention as illustrated herein the usual type of painter's hook 1 has a ball 2 riveted upon one end thereof and adapted to be received in a socket of a safety device to be now described. This safety device comprises a base 3 having a raised hollow boss 4 thereon having an inclined upper face 5. The boss is provided centrally with a socket 6 having recesses 7 formed therein to receive the projecting studs 8 of the Babbitt metal bushing 9. This bushing is preferably poured into the socket, while the ball is arranged therein but separated from engagement with the walls of the socket. Pivotally mounted upon a bolt 10 threaded into the boss adjacent one corner thereof are a pair of retaining members 11 and 12 which extend diagonally across the boss and are provided with semi-circular recesses 13, the walls of which are under-cut, as shown at 14, to fit the ball. These retaining members are normally held in separated relation by a spring 15 arranged between them adjacent their pivotal points and when brought together over the ball and held in such position serve to hold the ball against displacement.

The member 11 carries a pivoted yoke 16 which is adapted to swing over the end of the member 12 and hold the members against separation. The bolt 10 holds the members down against the boss at one end and to provide means for holding the opposite end of the members against the base there is threaded into the boss diagonally opposite the socket a bolt 17 which holds both of the separable ends of the members 11 and 12 down upon the base when they are held in closed position by the yoke 11. Suitable pins 18 project upwardly from the base and limit the outward movement of the members 11 and 12 when released by the yoke 16.

The base 3 is provided with a plurality of apertures 19 and with lashing loops 20 and 21 by which the device may be lashed to the building in lieu of driving fastening devices through the apertures 19 and the underneath side of the base is provided with suitable calks 22 which prevent the base from slipping on the roof or other support.

What is claimed is:—

1. A safety device for roof hooks comprising a base having a raised boss with a socket therein, means to secure the base to a support, a pair of swinging retaining members for holding a hook ball in the socket, means for clamping the free ends of the members against the boss, means to normally spread the clamping members and means carried by one of the members for holding both members in operative position about the ball.

2. A safety device for roof hooks comprising a base having a raised boss with a socket therein, means to secure the base to a support, a pair of swinging retaining members for holding a hook ball in the socket, the retaining members being recessed adjacent their pivoted ends, a spring disposed in said recesses to normally spread the retaining members, means placed on one of the retaining members, adjacent its free end for holding the members in operative position about the ball, and a clamping bolt to detachably clamp the retaining members against the boss.

In testimony whereof I affix my signature in presence of two witnesses.

WILLIAM E. WATTS.

Witnesses:
MARIE A. FOULKS,
FLORENCE WATTS-MERRILL.